United States Patent [19]

Crabb et al.

[11] 4,398,617
[45] Aug. 16, 1983

[54] REAR AXLE-DRAWBAR OSCILLATION SUPPORT SYSTEM

[75] Inventors: Elmer R. Crabb, Montgomery; Nick D. Hoyle, Lisle, both of Ill.

[73] Assignee: Caterpillar Tractor Co., Peoria, Ill.

[21] Appl. No.: 334,024

[22] Filed: Nov. 18, 1981

[51] Int. Cl.³ ............... B62D 53/02; B60D 1/14; B60G 25/00
[52] U.S. Cl. .................... 180/235; 280/111; 280/467; 280/496; 280/499
[58] Field of Search ............... 180/235; 280/109, 111, 280/415 R, 467, 474, 492, 493, 494, 495, 496, 499

[56] References Cited

U.S. PATENT DOCUMENTS

| | | |
|---|---|---|
| 1,540,413 | 2/1924 | Milner |
| 2,187,411 | 1/1940 | Bechman .................. 280/496 |
| 2,189,667 | 2/1940 | Kries ........................ 280/493 |
| 2,561,300 | 9/1949 | Walker ...................... 214/113 |
| 3,677,565 | 7/1972 | Slosiarek .................. 280/474 |
| 3,811,699 | 5/1974 | Casey ....................... 180/235 |
| 3,982,604 | 9/1976 | Crawford .................. 180/158 |
| 4,034,822 | 7/1977 | Stedman ................... 180/235 |
| 4,042,053 | 8/1977 | Sieren et al. ............. 280/496 |

Primary Examiner—David M. Mitchell
Assistant Examiner—Donn McGiehan
Attorney, Agent, or Firm—Joseph W. Keen

[57] ABSTRACT

An oscillating rear axle assembly (30) and associated drawbar (40) which oscillates therewith. The rear axle (24) protrudes from an axle housing (32) which is joined to a support structure (34) extending forwardly therefrom. The support structure (34) is oscillatably joined to a rear frame (14) by two axially separated bearings (36, 38) disposed therebetween. The drawbar (40) is laterally guided by the rear axle assembly (30) and a pivot support structure (84) and is axially fixed as well as oscillatably joined to the rear frame (14) by a spherical bearing (52) to permit drawbar oscillation with the rear axle assembly (30).

7 Claims, 3 Drawing Figures

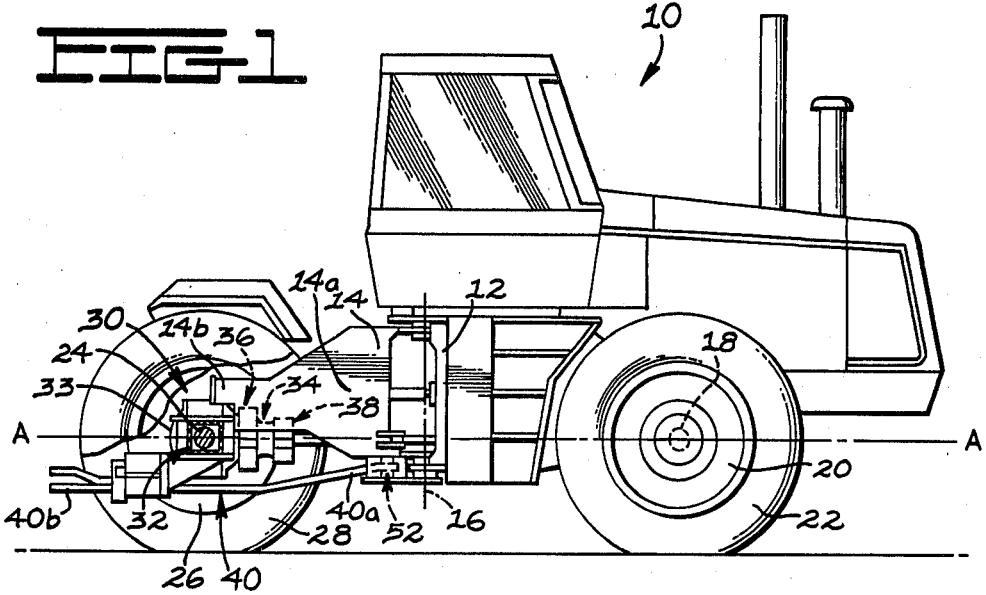
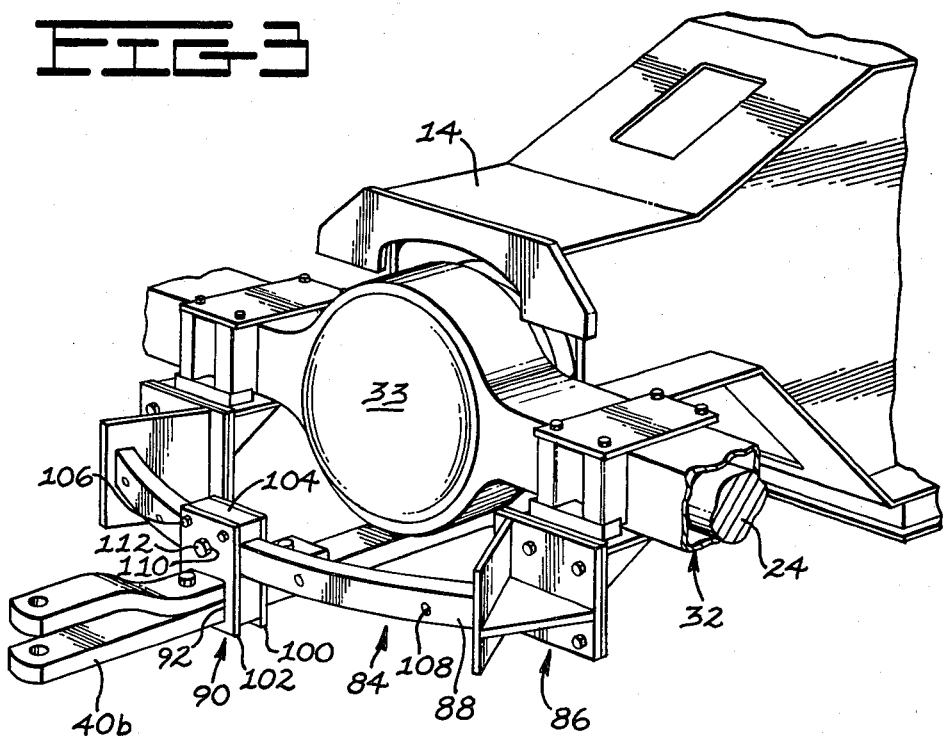

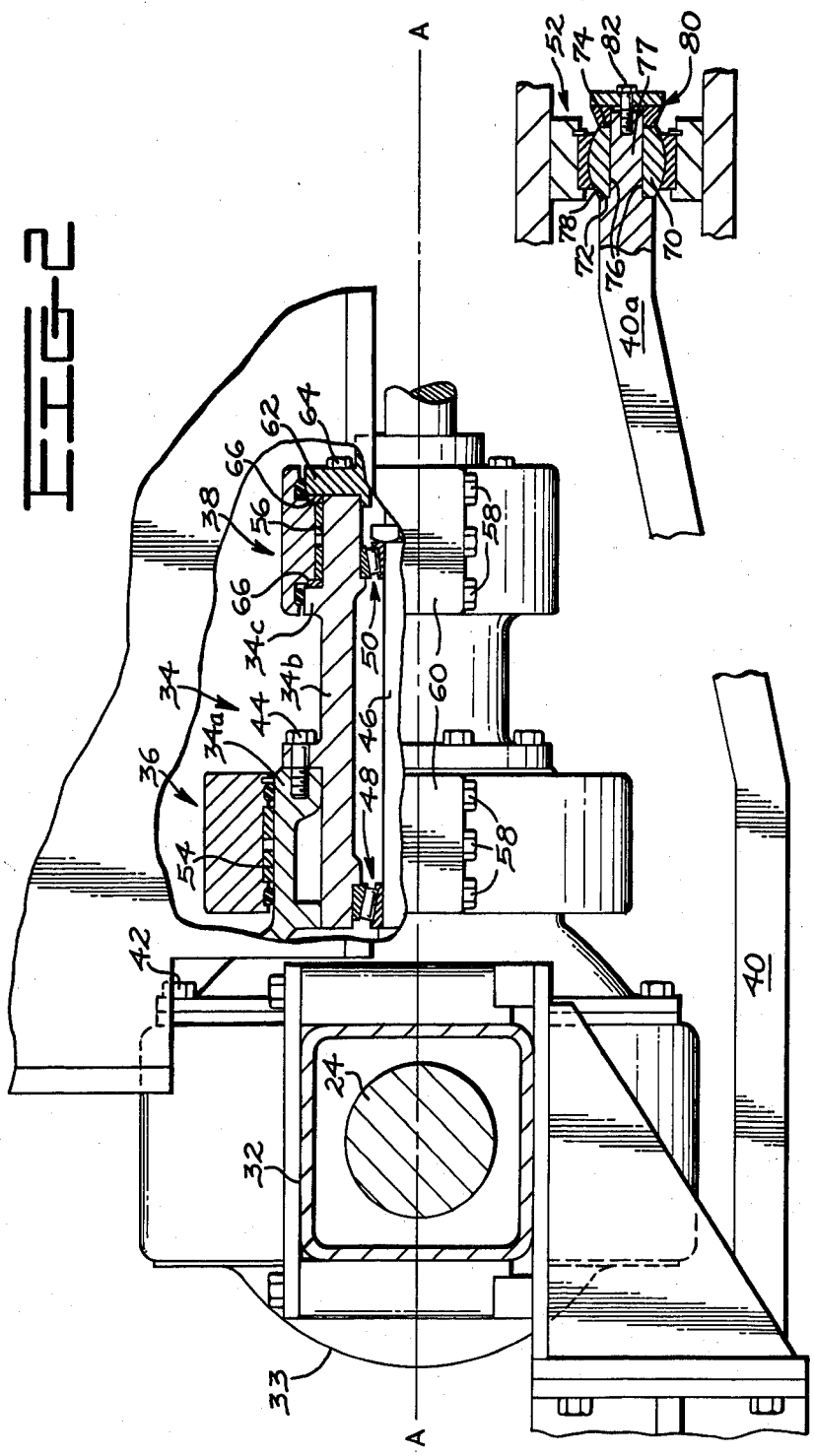

REAR AXLE-DRAWBAR OSCILLATION SUPPORT SYSTEM

DESCRIPTION

TECHNICAL FIELD

This invention relates to oscillating rear axle and cooperating drawbar support structures and, more particularly, to a cantilevered, dually supported oscillating rear axle assembly and drawbar laterally guided thereby.

BACKGROUND ART

Large, four-wheel drive articulated tractors which utilize rear axle oscillation typically incorporate their rear axle with their rear frame so as to simultaneously oscillate the rear axle and rear frame relative to the front frame. Such simultaneous oscillation is usually provided through rather complex linkage systems which change the attitude of the vehicle and can, under some circumstances, adversely affect the life of the vehicle's drive line.

Another common means for oscillating the rear frame (and connected rear axle) involves the use of an A-frame with spherical ball bushings located above the rear axle's center line. The cost for such axle oscillation structure can be substantial.

Traditional axle oscillation necessitates the use of a support bearing on each axial side (front and rear) of the axle to be oscillated. When the oscillating axle is the rear axle, the support bearing arranged at the rear of such axle extends the vehicle behind the rear axle and thus causes loads drawn thereby to be pulled at a greater distance behind the rear tires or other ground engaging members. Such additional distance between the vehicle's rear tires and the load reduces the load necessary to raise the vehicle's front end or, in the alternative, causes additional weight to be added to the vehicle's front end.

U.S. Pat. No. 2,561,300 which issued July 17, 1951, illustrates a lift truck employing a cantilevered, oscillatable rear frame which is supported by dual support bearings arranged ahead of the rear axle. Such lift truck has no power transmitted to its rear wheels nor does it have a drawbar for pulling loads behind it. Since the entire rear frame of the subject lift truck oscillates, expense for building the same may be substantially greater than if the axle alone oscillated. U.S. Pat. No. 1,540,413 which issued June 2, 1925, illustrates a draw bar which is biased forward by a spring and is fixably attached to the tractor rear axle and the tractor frame. Since the illustrated tractor's frame and rear axle are attached, oscillation of the rear axle is restricted as is oscillation of the drawbar which is fixed thereto.

DISCLOSURE OF THE INVENTION

In accordance with the present invention an oscillating rear axle assembly and cooperating drawbar structure are provided in which a rear axle which protrudes from an axle housing is supported in a cantilevered relationship by two bearings arranged in front of the axle housing between a support structure connected to the axle housing and a rear frame. A drawbar for drawing loads extends beneath the rear frame and rear axle assembly, is laterally guided by the rear axle assembly and is oscillatably mounted to the rear frame so as to oscillate with the rear axle to provide an optimum load drawing configuration for the drawbar.

Disposition of both support bearings forwardly of the axle housing provides a shorter distance between the vehicle's most rearwardly ground engaging members and the drawn load so as to maximize the utilizing vehicle's drawn load capacity prior to raising the front end of the vehicle. Use of such oscillated rear axle in combination with the oscillated drawbar increases the utilizing vehicle's stability and provides a drawbar configuration whose attitude changes to more closely reflect changes in the terrain and, thus, the position of the drawn load.

BRIEF DESCRIPTION OF THE DRAWING

FIG. 1 is a partially sectioned side elevational view of an articulated, four-wheel drive tractor utilizing the present invention;

FIG. 2 is an enlarged, partial transverse sectional view of a rear axle assembly and cooperating drawbar arrangement taken from FIG. 1; and FIG. 3 is a pictorial view of the rear of the rear axle assembly and drawbar.

BEST MODE FOR CARRYING OUT THE INVENTION

Referring now to the drawing in detail, a tractor 10 is illustrated in FIG. 1 and may be seen to include a front frame 12 and a rear frame 14 which are relatively articulatable about a vertical hinge axis 16. The rear frame 14 has a forward end 14a adjacent the front frame 12 and a rearward end 14b remote therefrom. The front frame 12 is supported by a front axle 18 upon which is mounted a pair (one on either side) of wheels 20. A tire 22 is mounted on each wheel 20 to engage the ground and apply a tractive effort to loads drawn behind the vehicle 10.

A rear axle 24 is oscillatably joined to the rear frame 14 in a manner to be hereinafter described and is joined to a pair of wheels 26 (one being disposed on each side of the rear frame 14). A ground engaging member such as tire 28 is mounted on each wheel 26. A rear axle assembly 30 constitutes an axle housing 32 within which the rear axle 24 is rotatably supported in a well known manner and from which the rear axle 24 laterally protrudes. The rear axle assembly 30 also includes a support structure 34 which extends toward the front frame 12 from the axle housing 32 and a differential casing 33. A first and a second support bearing 36 and 38, respectively, rotatably support the support structure 34 relative to the rear frame 14 to permit oscillatory movement of the rear axle assembly 30 and rear axle 24 relative to the rear frame 14 in response to changing terrain.

A drawbar 40 extends beneath the rear axle assembly 30 and rear frame 14 to provide a hitch for attaching loads and drawing the same with the vehicle 10. The drawbar 40, rear frame 14, and rear axle assembly 30 are better illustrated in FIG. 2 wherein the support structure 34 may be seen to include an axle housing cover 34a for enclosing the axle housing 32 and a support extension 34b having a longitudinal axis AA. The axle housing cover 34a is joined to the axle housing 32 by a plurality of bolts 42 (only two are shown) while the support extension 34b is joined to the axle housing cover 34a by another plurality of bolts 44 (only two of which are shown). A drive shaft 46 is journaled within the support extension 34b by bearings 48 and 50 so as to provide input power from an engine or other power source to the interior of the rear axle assembly 30.

The drawbar 40 includes a forward end 40a which is oscillatably supported on the rear frame 14 and a rearward end 40b which provides the connection point for loads or implements. The drawbar's rearward end 40b is generally pivotable into and out of the paper about a spherical bearing connection 52 at the forward end 40a.

The axle housing cover 34a has a first engagement surface 54 and the support extension 34b has a second engagement surface 56. The support bearing 36 is engageable with the first engagement surface 54 and the support bearing 38 is engageable with the second engagement surface 56. The outer peripheries of the support bearings 36 and 38 are joined to the rear frame 14 preferably by bolts 58 extending through lateral tabs 60 integral with the bearings as best seen in FIG. 2. The second bearing 38 has associated therewith means for preventing relative axial movement along the longitudinal axis AA between the bearing 38 and the support extension 34b which includes a thrust shoulder 34c disposed along one axial end of the bearing 38 and an end cap 62 which laterally bounds the other axial end of the bearing 38. The end cap 62 is held in position by bolts 64 which axially extend therethrough and into threaded engagement with the support extension 34b. The means for preventing relative axial movement between the bearing 38 and the support extension 34b includes a thrust washer 66 disposed at each axial end of the bearing 38 in engagement with the bearing 38 and the support extension thrust shoulder 34c at one axial end and with the end cap 62 at the other axial end of the bearing 38.

The spherical bearing 52 between the rear frame 14 and the drawbar 40 includes a body portion 70 with a rear face 72 and a front face 74. An opening 76 extends through the body portion 70 between the rear and front faces 72 and 74, respectively. The drawbar 40 has a connection portion 77 and a rear shoulder portion 78 which respectively extends through the opening 76 and abuts the rear face 72 of the spherical bearing 52. A thrust cap structure 80 or other means for preventing rearward displacement of the drawbar 40 relative to the spherical bearing 52 is engageable with the bearing's front face 74 and is fixed to the drawbar 40 with a bolt 82 which extends through the thrust cap 80 and into threaded engagement with the drawbar's connection portion 77.

A pivot support structure 84 or other means for laterally guiding, supporting and fixing the drawbar's rear end 40b at a desired location is provided (as best seen in FIG. 3) for side hitching loads such as ground engaging implements. The drawbar's pivot support structure 84 includes a pair of bracing systems 86 which are secured to the axle housing 32 on opposite sides of the differential casing 33, an arcuate bolster segment 88 disposed between and connected at its ends to the bracing systems, and a guide structure 90 which is slidably displaceable on the bolster segment 88 between the bracing systems 86. The guide structure 90 has an opening 92 through which the drawbar's rear end 40b is receivable in closely spaced relationship. The guide structure 90 includes a front and a rear securement plate 100 and 102, respectively, which are separated by a slider member 104 which is slidably engageable with the bolster segment 88. A pair of bolts 106 extends through and holds together the securement plates 100 and 102 as well as the separating slider member 104. The bolster segment 88 has five (by example) spaced apart holes 108 and the securement plates 100 and 102 each have a single locating hole 110. A pin such as bolt 112 is insertable through the holes 108 and 110, when suitably aligned, to secure the drawbar's rear end 40b at a desired location.

INDUSTRIAL APPLICABILITY

The rear frame 14, oscillating rear axle assembly 30, and oscillating drawbar 40 provide a stable structure for use in tractors where the drawbar 40 moves with the oscillating rear axle assembly 30 and guidably regulates the attitude of the drawbar 40 to reflect the underlying terrain and better match the orientation of the drawn load. As the vehicle 10 traverses uneven terrain, the rear axle assembly 30 oscillates with respect to the rear frame 14 and rotates about the rear frame 14 on the bearings 36 and 38. By disposing both bearings 36 and 38 on the forward side of the rear axle housing 30 closer coupling of the load to the vehicle 10 is made possible since neither of the bearings 36 or 38 extends rearwardly from the axle housing 32.

Power is transmitted through the drive shaft 46 to the rear axle 24 in a manner which extends the life of the drive shaft 46 by having its axial center line coincident with the axis AA. The drive shaft bearings 48 and 50 advantageously journal the drive shaft 46 to provide intermediate support therefor between an unillustrated universal joint or other coupler (provided in the vicinity of the vehicle's articulation axis 16) and the gears (not shown) contained within the axle housing 32.

Relative axial displacement of the rear frame 14 and the rear axle assembly 30 is effectively resisted by the thrust shoulder 34c and restraining end cap 62. In addition to preventing relative axial motion, assembly and disassembly of the rear frame 14, bearings 36 and 38, the axial housing cover 34a and the support extension 34b is facilitated.

The drawbar 40 (by virtue of its interconnection with the rear frame 14 through the spherical bearing 52) is pivotable into and out of FIGS. 1 and 2 as well as being oscillatable about the axis AA to reflect the actual motion and attitude of the rear axle assembly 30. Oscillation of the drawbar 40 with the rear axle assembly 30 is ensured by the guiding forces exerted by the rear axle assembly 30 on the drawbar 40 through the guide structure 90, guide bolt 112, bolster segment 88, and bracing systems 86. The guide bolt 112, by maintaining area contact between the separating slider member 104 and the bolster segment 88 at their interfacing slidable surfaces, effectively transmits the guiding forces from the bolster segment 88 to the guide structure 90.

It should now be apparent that a vehicle 10 having improved stability, greater load capacity, and better drawbar positional reaction to changing ground conditions has been provided. The improved stability of the vehicle 10 is primarily a result of the rear axle oscillation while the increased load capacity obtains from supporting the rear axle assembly 30 in a cantilevered manner forwardly of the axle housing 32. The drawbar's improved positional response is primarily contributed by the structure which guidably connects the drawbar's rear end 40b to the rear axle assembly 30 and the structure which oscillatably and pivotally connects the drawbar's forward end 40a to the rear frame 14.

We claim:
1. A vehicle (10) comprising:
a front frame (12);

a rear frame (14) being articulatable relative to said front frame (12) and having a longitudinal axis (AA), said rear frame (14) including a forward end (14a) adjacent said front frame (12) and a rearward end (14b) remote thereto;
    a rear axle assembly (30) including an axle housing (32) disposed adjacent said rear frame's rearward end and
    a support structure (34) extending toward said front frame (12) and being connected to said axle housing (32), and having a longitudinal center line (AA);
a first (36) and a second (38) bearing disposed between said support structure (34) and said rear frame (14) forwardly of said axle housing (32) for oscillatably connecting said rear axle assembly (30) to said rear frame (14);
a drawbar (40) for pulling loads, said drawbar (40) extending below said axle housing (32) and said rear frame (14);
means (86,88,90,112) for oscillatably guiding said drawbar (40) with said rear axle assembly (30); and
means (52) for oscillatably connecting said drawbar (40) to said rear frame (14) about said longitudinal centerline (AA).

2. The vehicle (10) of claim 1 further comprising:
means (34c,66,62,64) associated with one of said bearings (38) for preventing relative axial movement between said bearing (38) and said rear axle assembly (30).

3. The vehicle (10) of claim 2, further comprising:
means (58) associated with said one bearing (38) for preventing relative axial movement between said bearing (38) and said rear frame (14).

4. The vehicle (10) of claim 1, further comprising:
a drive shaft (46) rotatably supported within said support structure (34) for transmitting power to the interior of said axial housing (32).

5. The vehicle (10) of claim 1, said oscillatable connecting means (52) comprising:
a spherical bearing (52) having a body portion (70) with a rear face (72) and a front face (74), said bearing (52) having an opening (76) through said body portion (70) extending between said faces (72,74).

6. The vehicle (10) of claim 5 wherein a portion (77) of said drawbar (40) extends through said spherical bearing's opening (76) and has a shoulder (78) for engagement with the rear face (72) of said bearing (52); and
means (80,82) engageable with said spherical bearings front face (72) and said drawbar (40) for preventing rearward displacement of said drawbar (40) relative to said spherical bearing (52).

7. The vehicle (10) of claim 1, said support structure (34) comprising:
an axle housing cover (34a) for enclosing said axle housing (32), said axle housing cover (34a) converging toward said centerline (AA) along a direction toward said front frame (12), said axle housing cover (34a) having a first engagement surface (54) for mating with one of said bearings (36); and
a support extension (34b) joinable with said axle housing cover (34a) and extending toward said front frame (12) from said axle housing cover (34a), said support extension (34b) having a second engagement surface (56) for mating with the other bearing (38).

* * * * *